(12) United States Patent
Yang et al.

(10) Patent No.: US 9,501,724 B1
(45) Date of Patent: Nov. 22, 2016

(54) FONT RECOGNITION AND FONT SIMILARITY LEARNING USING A DEEP NEURAL NETWORK

(71) Applicant: ADOBE SYSTEMS INCORPORATED, San Jose, CA (US)

(72) Inventors: Jianchao Yang, San Jose, CA (US); Zhangyang Wang, Urbana, IL (US); Jonathan Brandt, Santa Cruz, CA (US); Hailin Jin, San Jose, CA (US); Elya Shechtman, Seattle, WA (US); Aseem Omprakash Agarwala, Seattle, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 14/734,466

(22) Filed: Jun. 9, 2015

(51) Int. Cl.
*G06K 9/00* (2006.01)
*G06K 9/36* (2006.01)
*G06K 9/66* (2006.01)
*G06K 9/62* (2006.01)
*G06K 9/68* (2006.01)
*G06T 3/40* (2006.01)

(52) U.S. Cl.
CPC .................. *G06K 9/66* (2013.01); *G06K 9/627* (2013.01); *G06K 9/6828* (2013.01); *G06T 3/40* (2013.01); *G06T 2210/22* (2013.01)

(58) Field of Classification Search
CPC ........ G06K 9/66; G06K 9/4628; G06K 9/32; G06K 9/00127; G06K 9/00456; G06K 9/6828; G06K 9/627; G06T 3/40; G06T 2210/22
USPC ....... 382/159, 155, 156, 181, 276, 286, 224, 382/226, 161, 310, 209, 290; 345/501, 418, 345/467, 468, 156, 168, 170, 471; 707/E17.009, E17.001, E17.022, 707/E17.019, E17.02; 715/200, 234, 205, 715/255, 235
See application file for complete search history.

(56) References Cited

U.S. PATENT DOCUMENTS

| 5,542,006 | A  | * | 7/1996  | Shustorovich  | G06K 9/32  |
|           |    |   |         |               | 382/156    |
| 5,912,986 | A  | * | 6/1999  | Shustorovich  | G06K 9/32  |
|           |    |   |         |               | 382/156    |
| 7,151,852 | B2 | * | 12/2006 | Gong          | G06F 17/30802 |
|           |    |   |         |               | 348/588    |
| 7,436,994 | B2 | * | 10/2008 | Huang         | G06K 9/00456 |
|           |    |   |         |               | 382/156    |
| 7,702,145 | B2 | * | 4/2010  | Revow         | G06K 9/6255 |
|           |    |   |         |               | 382/156    |
| 2008/0130997 | A1 | * | 6/2008 | Huang         | G06K 9/3266 |
|           |    |   |         |               | 382/181    |

* cited by examiner

*Primary Examiner* — Sheela C Chawan
(74) *Attorney, Agent, or Firm* — Shook, Hardy & Bacon L.L.P.

(57) ABSTRACT

A convolutional neural network (CNN) is trained for font recognition and font similarity learning. In a training phase, text images with font labels are synthesized by introducing variances to minimize the gap between the training images and real-world text images. Training images are generated and input into the CNN. The output is fed into an N-way softmax function dependent on the number of fonts the CNN is being trained on, producing a distribution of classified text images over N class labels. In a testing phase, each test image is normalized in height and squeezed in aspect ratio resulting in a plurality of test patches. The CNN averages the probabilities of each test patch belonging to a set of fonts to obtain a classification. Feature representations may be extracted and utilized to define font similarity between fonts, which may be utilized in font suggestion, font browsing, or font recognition applications.

20 Claims, 8 Drawing Sheets

FONT RECOGNITION AND FONT SIMILARITY LEARNING USING A DEEP NEURAL NETWORK

BACKGROUND

With the advent of computers and digital typography, the number of different fonts has continued to grow. As a result, users often have wide flexibility in choosing fonts in various applications. Given the large number of available fonts, the task of recognizing (i.e., classifying) fonts or identifying similar fonts has become more challenging. In particular, there are a number of scenarios in which it may be desirable to recognize the font or identify the similarity between two fonts among a collection of fonts. For instance, given an image containing text, a user may wish to simply identify the font in the image. In another example, a user may wish to find a font that is similar to the font in the image because use of the font in the image is costly or not available in a particular application.

Some systems have been developed for recognizing fonts and identifying similar fonts. However, such systems often use a limited amount and type of information that restricts their ability to recognize or identify similar fonts. In particular, these systems were developed with a small scale of font categories. As a result, these systems are unable to recognize fonts or identify similar fonts for fonts that are not known by the system. Further, because there are subtle variances between fonts within the real-world images and fonts already known to the system, the accuracy of these systems are deficient in both recognizing fonts and identifying similar fonts. As a result of these and other limitations, such systems rely on significant user interaction and subjectivity and are often inadequate in recognizing and sufficiently comparing fonts in real-world images.

SUMMARY

This summary is provided to introduce a selection of concepts in a simplified form that are further described below in the Detailed Description. This summary is not intended to identify key features or essential features of the claimed subject matter, nor should it be used as an aid in determining the scope of the claimed subject matter.

Embodiments of the present invention relate to font recognition and font similarity identification and learning. Initially, in a training phase, text images with font labels identifying the font in each of the text images are obtained for training a convolutional neural network (CNN). The text images are synthesized by introducing slight variances that replicate slight variances in real-world text images. The synthesis process results in the generation of training images that are utilized as input to the CNN. The output of the CNN results in a distribution of classified text images over the fonts being classified. In a testing phase, a test image is normalized in height and squeezed in aspect ratio to generate a plurality of test patches which are utilized as input to the CNN. The CNN averages the probability of each test patch belonging to a set of fonts to obtain a font classification. In embodiments, feature representations may be extracted from a test image by the CNN and utilized to define font similarity between the test image and one or more fonts. The font similarity may be utilized in font suggestion, font browsing, or font recognition applications. By synthesizing test images, the gap between the rendered test images and the real-world text images is minimized and the accuracy for all applications is greatly increased.

BRIEF DESCRIPTION OF THE DRAWINGS

The present invention is described in detail below with reference to the attached drawing figures, wherein.

DETAILED DESCRIPTION

Figure 1:
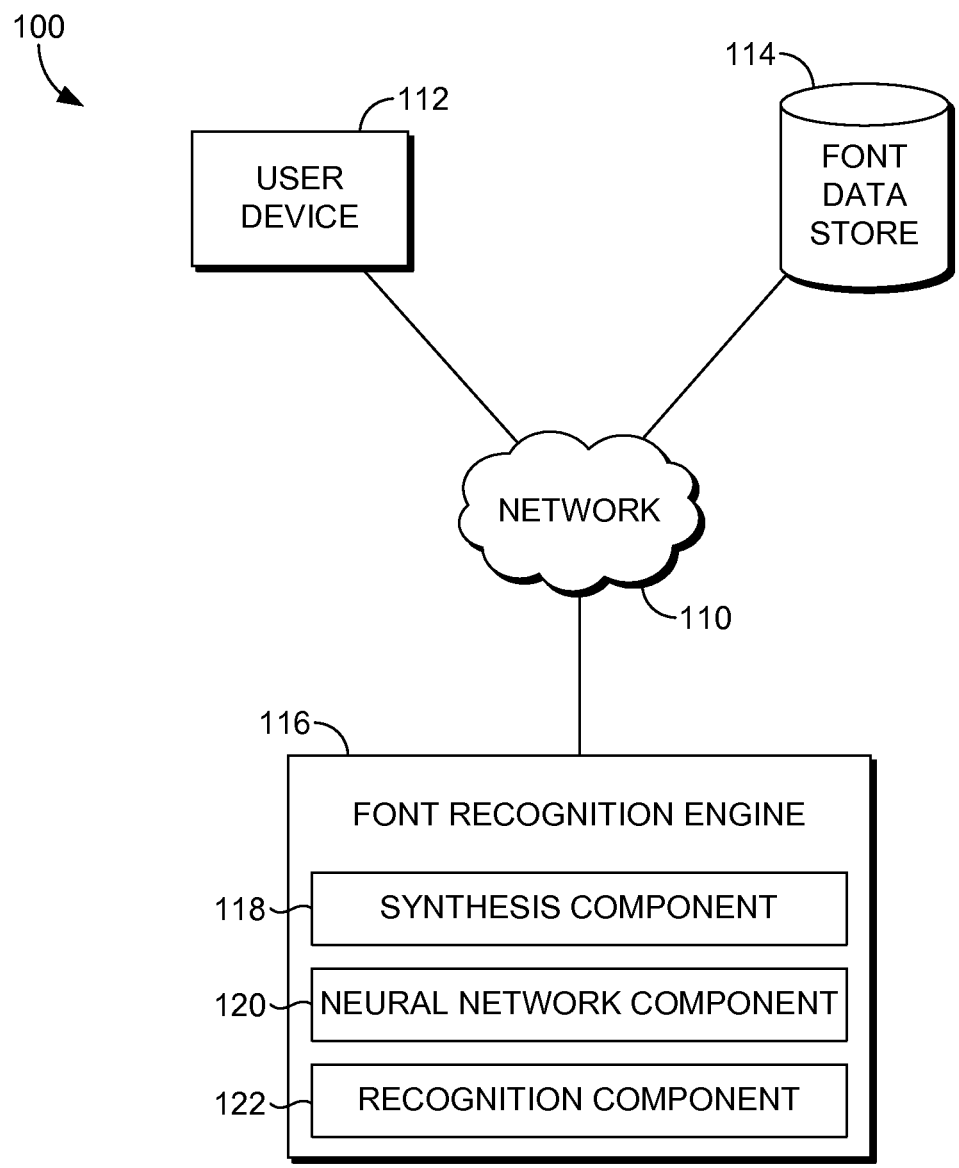
FIG. 1 is a block diagram showing a font recognition and similarity system for recognizing and suggesting fonts in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted in the Background, a number of systems have been developed for classifying fonts. However, these systems typically fall short in their usefulness because they are limited to the small scale of font categories they are developed with and are unable to handle the large number of font classes that exist in real-world images. These limitations are due, in large part, to the reliance on significant user labeling and interaction which prevents these systems from being able to handle recognition and similarity identification for a large collection of fonts, or fonts previously unknown to the systems. Additionally, because these systems rely so heavily on user labeling and interaction, application is often subjective, which further limits their ability to recognize or accurately identify similar fonts.

Embodiments of the present invention are generally directed to a data-driven font recognition and similarity identification system based on a convolutional neural network (CNN). Experimental tests have shown that the system achieves nearly 80% top-five accuracy on a collection of real-world text images. The system has also proven to be effective for font organization, font selection, font browsing, and font suggestion.

Initially, a CNN is trained utilizing text images with font labels during a training phase. The text images are synthesized (as described herein) images containing text. The font labels or classifications are information that identifies a font corresponding with each text image. The training phase, which is described in more detail below, comprises two primary steps: data synthesis and preprocessing; and 2) deep CNN network structure design and training. After the CNN is designed and trained, is performed in order to identify a font classification for a test image. In the testing phase, an input test image is preprocessed in the same way as text images are preprocessed during the training phase (as will be described in further detail below), and the preprocessed test images are fed into the CNN for recognition. The output of the testing phase provides a font classification for the test image.

For producing font similarity, intermediate layer outputs can be extracted from the CNN as feature representations. The feature representations are feature vectors that are output by the CNN and distinguish one font classification from another. On the other hand, the feature representations are also able to be utilized to define similarity between different fonts. The learned feature representations are not constrained to the set of fonts the CNN is trained on. In other words, font similarity can be generalized to recognize fonts the CNN has never seen.

Font similarity may then be applied in a number of other applications. For example, a designer may want to find similar fonts to a particular font. The particular font may not be available to the designer because of cost or other reasons. In this way, similar fonts may be identified and suggested to the designer as an alternative to the particular font. In another example, font similarity may be utilized to build a similarity graph for a collection of fonts, which can be browsed by the user to identify similar fonts.

As mentioned above, the font similarity may allow the system to recognize fonts the system has never seen. For example, given a test image, the CNN may be utilized to extract a feature representation. For a new collection of fonts the system has never seen, training images can be synthesized on the fly and their feature representations can also be extracted. A nearest neighbor classifier can then be utilized to classify the input test image into one of the new collection of fonts.

Referring now to FIG. 1, a block diagram is provided that illustrates a font recognition and similarity system 100 for recognizing and suggesting fonts in accordance in accordance with an embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The font recognition and similarity system 100 may be implemented via any type of computing device, such as computing device 800 described below with reference to FIG. 8, for example. In various embodiments, the font recognition and similarity system 100 may be implemented via a single device or multiple devices cooperating in a distributed environment.

The font recognition and similarity system 100 generally operates to recognize fonts and/or identify similarity between a font in a test image and a collection of fonts. As shown in FIG. 1, the font recognition and similarity system 100 includes, among other components not shown, the font recognition and similarity system 100 may include a user device 112, a font data store 114, and a font recognition engine 116. It should be understood that the font recognition and similarity system 100 shown in FIG. 1 is an example of one suitable computing system architecture. Each of the components shown in FIG. 1 may be implemented via any type of computing device, such as computing device 800 described with reference to FIG. 8, for example. The components may communicate with each other via a network 110, which may include, without limitation, one or more local area networks (LANs) and/or wide area networks (WANs). Such networking environments are commonplace in offices, enterprise-wide computer networks, intranets, and the Internet. It should be understood that any number of user devices, font data stores, and font recognition engines may be employed within the font recognition and similarity system 100 within the scope of the present invention. Each may comprise a single device or multiple devices cooperating in a distributed environment. For instance, the font recognition engine 116 may be provided via multiple devices arranged in a distributed environment that collectively provide the functionality described herein. In another instance, the font recognition engine 116 and one or more of the other components that comprise the font recognition and similarity system 100 may be provided via a single device. Additionally, other components not shown may also be included within the network environment.

As shown in FIG. 1, the font recognition and similarity system 100 includes a font data store 114. While only a single font data store 114 is shown in FIG. 1, it should be understood that the font recognition and similarity system 100 may employ any number of font data stores. The font data store 114 may be utilized by the font recognition engine 116 to synthesize and preprocess training images that can be utilized by the CNN. The font data store 114 may also store feature representations for a collection of fonts that can be utilized by the font recognition and similarity system 100 to recognize fonts and identify similar fonts.

As shown in FIG. 1, the font recognition engine 116 includes, among other things not shown, a synthesis component 118, a neural network component 120, and a recognition component 122. Initially, the synthesis component 118 prepares training data (i.e., text images with font labels) for the CNN. Collecting real-world text images with font labels can be extremely difficult. The synthesis component 118, with access to a collection of fonts (i.e., such as from font data store 114), renders text images. In some embodiments, the text images are black text on white background.

In real-world applications, real-world text images are much more complicated than rendered text images. For example, real-world text images are likely to contain variable character spacing, may be stretched in aspect ratio, and may be corrupted by clutter background, noise, compression artifacts, perspective transformation, low-resolution, and the like. Therefore, in order to build an accurate system, the gap between the rendered text images and real-world text images is minimized by the synthesis component 118 before the rendered text images are utilized to train the CNN (such as the one illustrated in FIG. 2 and described below).

In order to minimize the gap, the synthesis component 118 performs a number of actions to process the rendered text images to generate training images. The synthesis component 118 may set the character spacing in each rendered text image to randomly deviate from the default spacing. This helps simulate the variable spacing that is likely to exist in real-world text images.

A small Gaussian noise may be added by the synthesis component 118 to each rendered text image. In some embodiments a Gaussian noise N(0,3) is added in a scale of [0,255]. The Gaussian noise may simulate distortion in real-world text images that arises during acquisition (e.g., sensor noise caused by poor illumination, high temperature, and/or transmission).

Additionally or alternatively, the background of each rendered text image may be filled by the synthesis component 118 with a gradient to simulate a shading effect. This may simulate variable shading that is likely in some degree in real-world text images.

In some embodiments, the synthesis component 118 randomly perturbs each rendered text image by a small affine transformation. In this way, each rendered text image is slightly altered from its normal state. Examples of affine transformations include, translation, scaling, homothety, similarity transformation, reflection, rotation, and shear mapping.

In some embodiments, the synthesis component 118 adds a random degree of Joint Photographic Experts Group (JPEG) compression. The JPEG compression simulates compression artifacts that are likely to exist in real-world text images. For example, when a real-world text image that has been compressed is reproduced, the result is often diminished quality (i.e., an introduction of artifacts) because the compressor may not be able to reproduce enough data to reproduce the original real-world text image in the original quality or the compression algorithm may not be able to discriminate between distortions that are slight versus those that are noticeable to a viewer, or in this case a CNN.

The synthesis component 118 may normalize each rendered text image in height and squeeze each rendered text image in width. In some embodiments, the rendered text image is normalized to 105 pixels in height. In some embodiments, the rendered text image is squeezed in width by a random ratio uniformly in three different ratios. In some embodiments, the ratios are 1.5, 2.5, and 3.5.

In some embodiments, the synthesis component 118 adds a small amount of Gaussian blur to each rendered text image. This simulates the Gaussian blur that is often used by graphics software to reduce image noise and reduce detail. The synthesis component 118 may add the Gaussian blur to each rendered text image by convolving each rendered text image with a Gaussian function.

After the synthesis component 118 synthesizes each of the rendered text images into training images that simulate real-world text images, the training images can be cropped into image patches that will be provided as input to the CNN. In some embodiments, the training images are cropped into multiple square image patches. For example, each training image may be cropped into five 105×105 pixel square image patches. Since each training image may be squeezed in width by three different ratios, in some embodiments, fifteen image patches are generated as input to the CNN for each training image.

Figure 2:
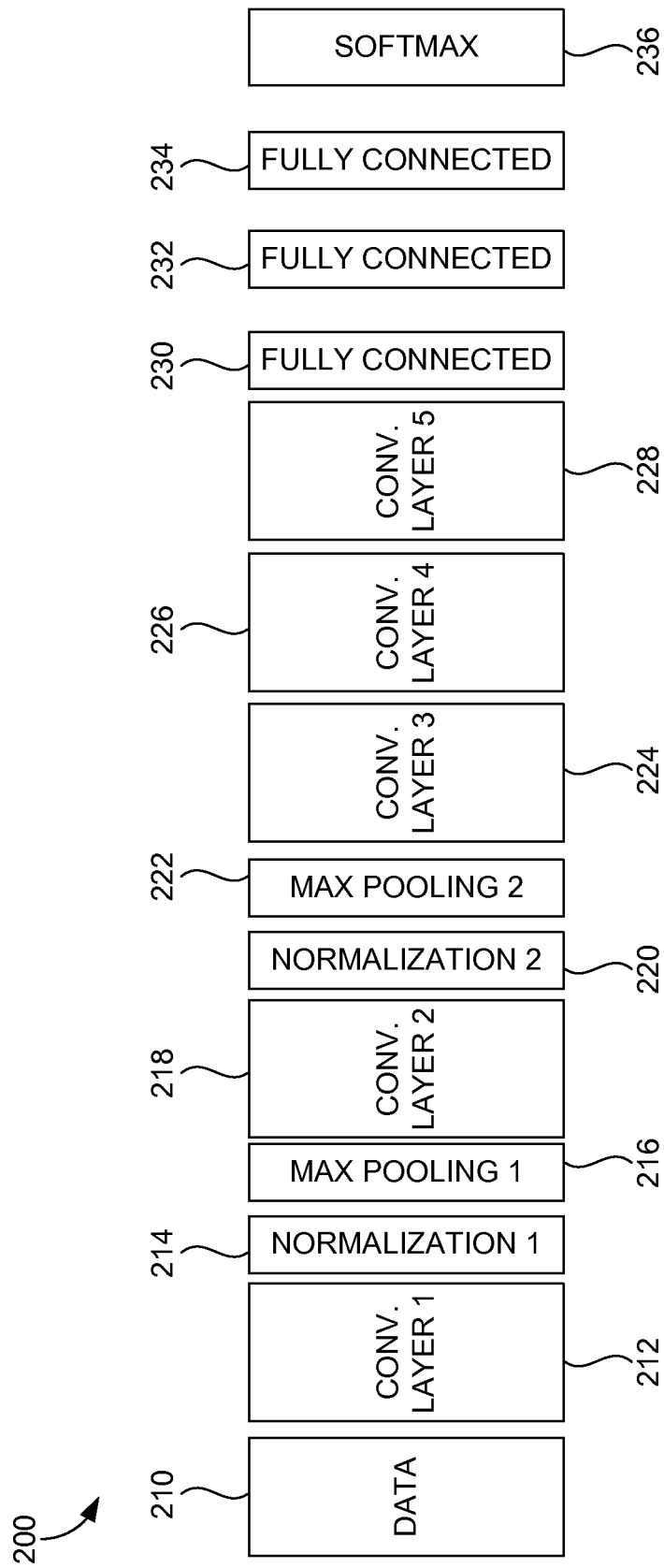
FIG. 2 is a flow diagram showing an exemplary convolutional neural network that can be trained and used to facilitate recognizing and suggesting fonts in accordance with an embodiment of the present invention.

Neural network component 120 facilitates designing and training of the CNN. In some embodiments, and referring now to FIG. 2, an exemplary CNN is illustrated that can be trained and used to facilitate recognizing and suggesting fonts. As shown in FIG. 2, the CNN contains eight layers. The input 210 of the CNN is fixed, in some embodiments, as 105×105 pixel gray scale image patches. The first five layers of the CNN may be convolutional layers 212, 218, 224, 226, 228 and the remaining three layers may be fully connected layers 230, 232, 234. In some embodiments, rectified linear unit (ReLU) non-linearity is applied to the output of each convolutional and fully connected layer.

Normalization 214, 220 and max-pooling 216, 222 layers may be added, in some embodiments, following the first two convolutional layers 212, 218. The output of the last fully connected layer 234 is fed, in some embodiments, into an N-way softmax 236, which produces a distribution over N class labels. As shown in FIG. 2, the output of the last fully connected layer 234 is fed into a 2383-way softmax 236 because the exemplary CNN is being trained on 2383 fonts. As can be appreciated, N represents the number of fonts the CNN is trained on. During training, the image patches are divided, in some embodiments, into small mini-batches. Stochastic gradient descent may be used for optimization, following the convention. Additionally or alternatively, the learning rate may be reduced by a factor of two after every epoch.

In some embodiments the size of the outputs of the first convolutional layer 212 and the first normalization layer 214 is 48×48×64 neurons. The first max pooling layer 216 may have a 24×24×64 neuron output. The second convolutional layer 218 and the second normalization layer 220 may have 24×24×128 neuron outputs. The size of the outputs of the second max pooling layer 222 may be 12×12×128 neurons. Each of the third, fourth, and fifth convolutional layers 224, 226, and 228 may have 12×12×256 neuron outputs. The first and second fully connected layers 230, 232 may have 4096 dimensional vector outputs while the last fully connected layer may have a 2383 dimensional vector output. The output of the last fully connected layer may be fed, in this example, into a 2383-way softmax which produces a distribution of labeled image patches over 2383 classification labels.

Referring back to FIG. 1, recognition component 122 facilitates testing of the CNN. A multi-scale multi-view (MSMV) testing strategy may be utilized to improve the robustness of the system. In this way, each test image may be normalized to 105 pixels in height and then squeezed in width by three different ratios: 1.5, 2.5, and 3.5. For each of the three respective squeezed ratios, five 105×105 pixel patches are cropped, in some embodiments, from the image resulting in a total of fifteen test patches which correspond to different aspect ratios and views from the input test image. The CNN outputs, in some embodiments, a softmax vector for each cropped image patch indicating a probability of the test image belonging to a set of fonts. Each of the fifteen softmax vectors may be averaged to obtain a final classifier for the test image.

Additionally or alternatively, the recognition component 122 may facilitate defining font similarities, which may be accomplished even without a predefined fixed set of fonts. To do so, for the i-th font, a single training image $I_i$ is synthesized utilizing any synthesis process described herein. Image patches may then be cropped from the training image and fed into the CNN. In some embodiments, n 105×105 pixel image patches are cropped from the training image. The second to last fully connected layer output for each image patch may then be obtained. In some embodiments, the output is denoted as $f_7$, which is a 4096-dimensional vector.

In some embodiments, a max operation is performed by the recognition component 122 along each dimension of $f_7$ across each of the image patches. Thus the feature representation for training image $I_i$ can be defined as $F_i = \max\{f_7^j\}$. As mentioned above, $f_7^j$ is the second to last fully connected layer output for the j-th image patch. As a result, $F_i$ is also a 4096-dimensional vector. To define the font similarity between font i and font j, an image $I_j$ for font j may be synthesized by the synthesis component 118, as described herein, utilizing the same text that was used for training image $I_i$. The feature representation $F_j$ may then be extracted by the recognition component 122 from $I_i$. The font similarity between i and j may be defined by the recognition component 122, in one embodiment, as $s(i,j) = F_i^T F_j$. In another embodiment, a radial basis function (RBF) kernel, $s(i,j) = \exp(-\|F_i - F_j\|_2^2/\sigma^2)$ may be utilized by the recognition component 122 to define font similarity.

To improve the font similarity process, in some embodiments, multiple training images may be synthesized by the synthesis component 118 using different text sequences for each font. Where multiple training images are synthesized, the font similarity between two fonts may be defined by the recognition component 122 as $S(i,j) = 1/K \Sigma_{k=1}^{K} s_k(i,j)$, where $s_k(i,j)$ is the font similarity based on the k-th synthesized training image.

In some embodiments, the recognition component 122 provides font suggestion or recommendation. For example, a designer may want to use a particular font for a design but the font is either too expensive or unavailable to the designer. The designer may utilize the font recognition similarity system 100 to find similar alternative fonts. In some embodiments, the recognition component 122 provides font organization and browsing functionality. In this regard, the recognition component 122 may build a similarity graph for a collection of fonts. The similarity graph may allow the designer to browse the collection of fonts.

In some embodiments, the recognition component 122 facilitates the recognition of a font never seen before by the font recognition and similarity system 100. In other words, the font may not be stored by the font data store 114. A feature representation may be extracted for a test image that includes the font, as described above. For a new collection of fonts that the font recognition and similarity system 100 has never seen (e.g., a unique collection of fonts on a designer's desktop system), training images may be synthesized (e.g., using common words) by the synthesis component 118 and the feature representations may be extracted by the recognition component 122.

In some embodiments, the synthesis process may be performed while the feature representation is being extracted from the test image. A nearest neighbor classifier, based on the feature representation, may then be utilized to classify the input test image into a font of the new collection of fonts. In some embodiments, hashing or other techniques may be utilized to speed up the nearest neighbor classifier. For example, if the feature representation is a vector of dimension 4096, vector quantization can convert the 4096 dimensional vector into a binary representation that approximates the feature representation, but is smaller to store and faster to compute. By determining the nearest neighbor classifier, the input test image is classified as the font of the new collection of fonts that is the most similar to the input test image.

Figure 3:
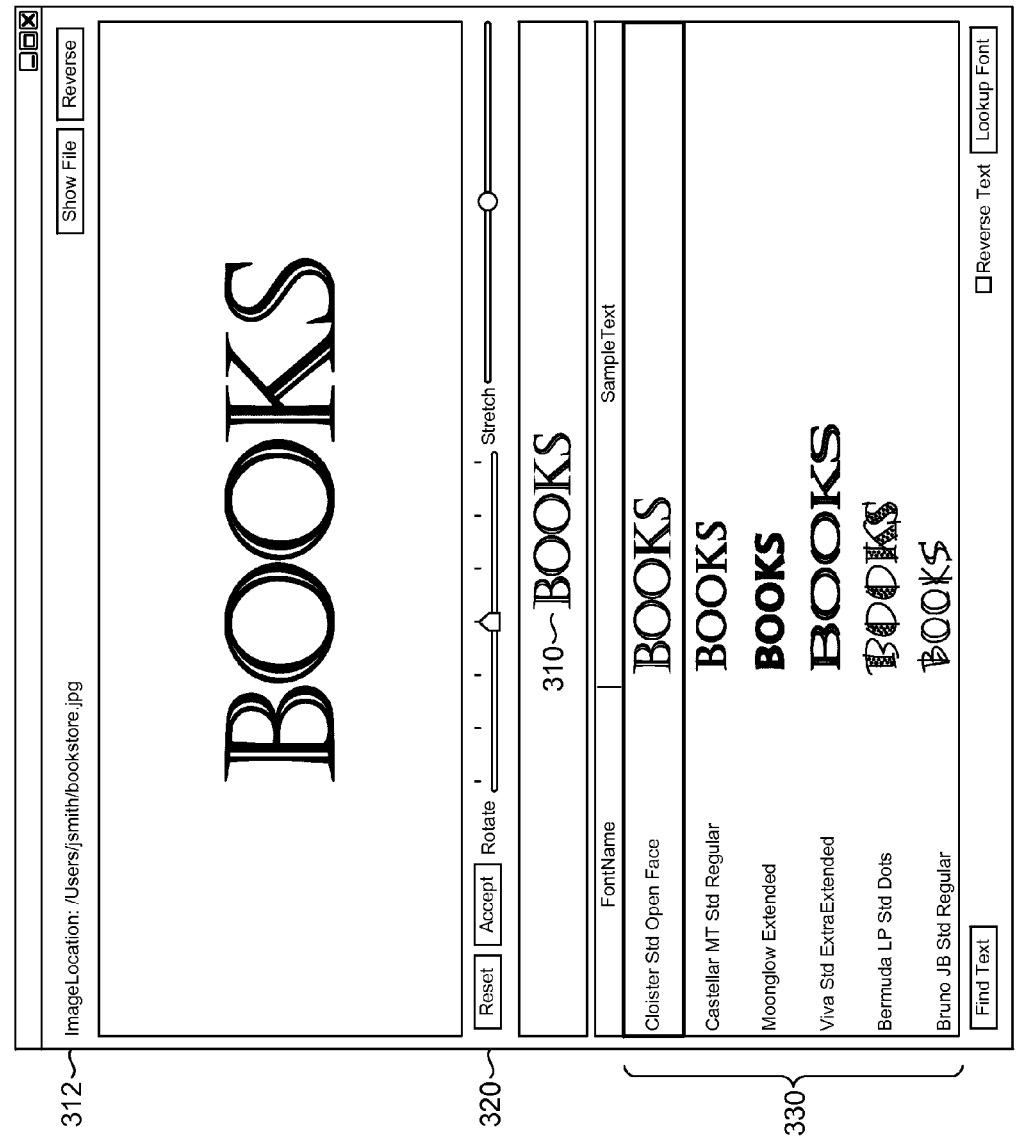
FIG. 3 is a diagram illustrating an exemplary ranked list of possible fonts provided for a test image utilizing the font recognition and similarity system in accordance with an embodiment of the present invention.

An exemplary ranked list of possible fonts that may be provided for a test image utilizing the font recognition and similarity system 100 of FIG. 1 is illustrated in FIG. 3. As shown in FIG. 3, an input image 310 comprising a font is selected from an image location 312. For example, a designer may have scanned in a particular text image to identify the font used in the text image. Or, in another example, the designer may have saved the particular text image from another source (e.g., online source) and would like to identify the font used by the source. Controls 320 may allow the designer to manipulate (e.g., rotate, stretch, and the like) the font image in accordance with the designer preferences. Once the designer is satisfied and accepts any manipulations, a list 330 of the most similar fonts is populated and ranked. As illustrated, the list 330 includes font names along with sample text that matches the text of the input image. The designer may use the list 330 for font suggestion and browsing.

Figure 4:
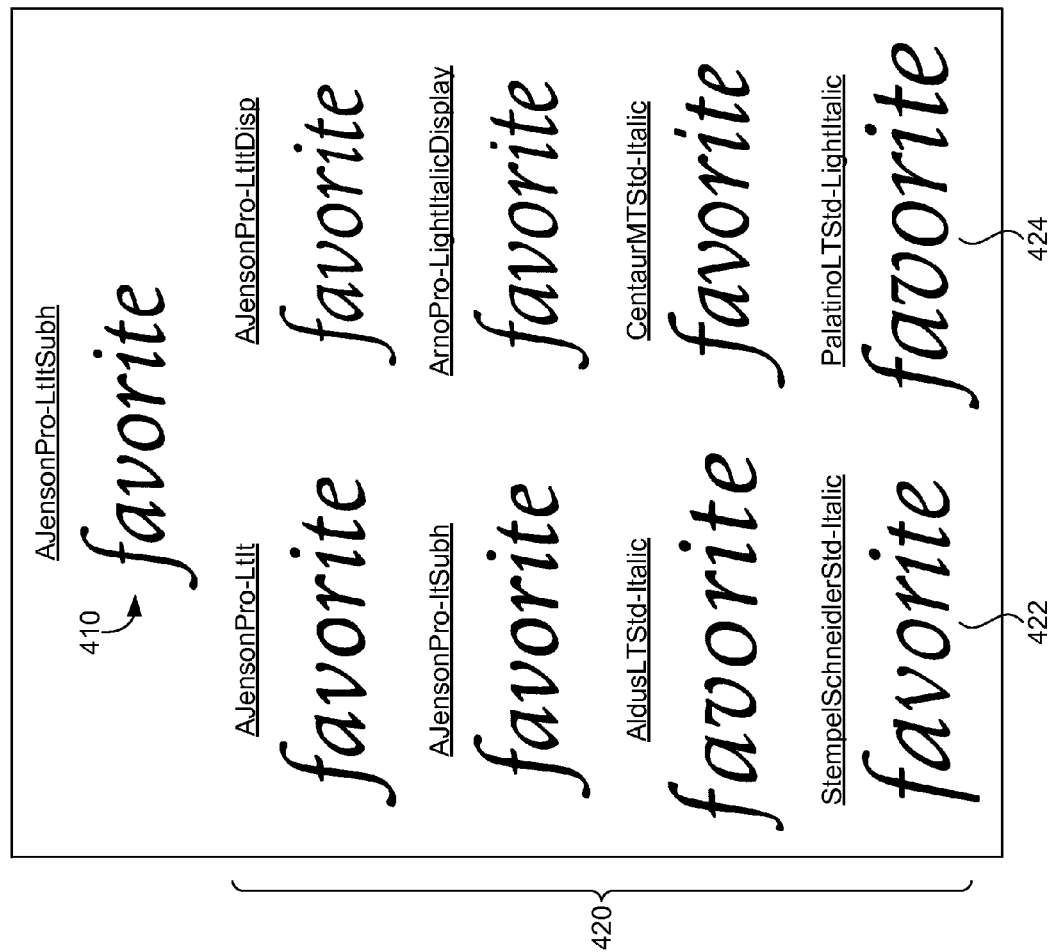
FIG. 4 is a diagram illustrating an exemplary list of similar fonts provided for a test image utilizing the font recognition and similarity system in accordance with an embodiment of the present invention.

By way of example to illustrate, FIG. 4 illustrates an exemplary list of similar fonts that may be provided for a test image utilizing the font recognition and similarity system 100 of FIG. 1. In particular, FIG. 4 illustrates a query font 410. As shown, similar fonts 420 are provided below the query font 410. Each of the fonts 422, 424 that appear at the bottom of the list have been determined by the font recognition and similarity system 100 as the most similar fonts to the query font 410.

Figure 5:
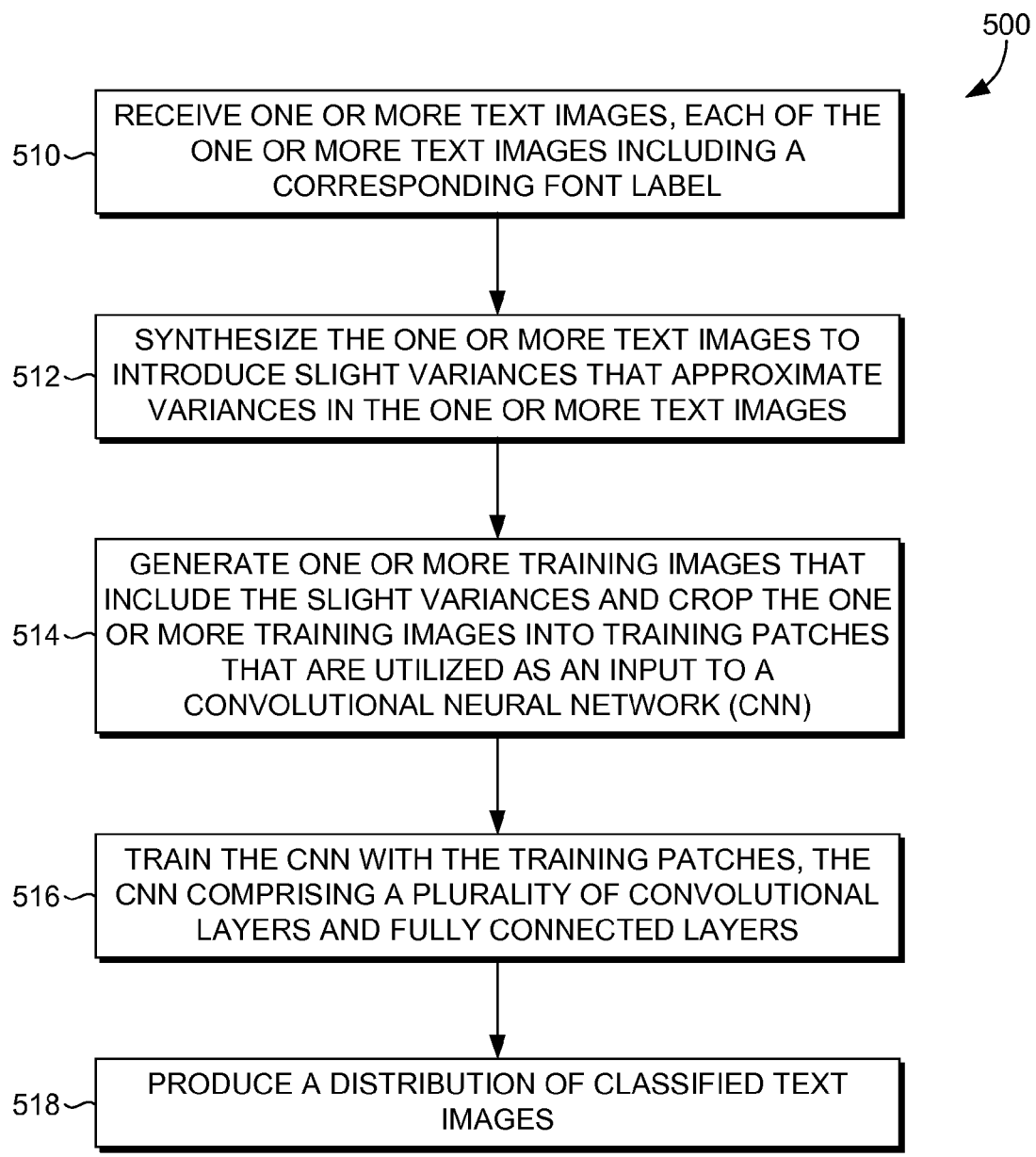
FIG. 5 is a flow diagram showing a method for training a convolutional neural network in accordance with an embodiment of the present invention.

Turning now to FIG. 5, a flow diagram is provided that illustrates a method 500 for training a CNN in accordance with an embodiment of the present invention. For instance, the method 500 may be employed utilizing the font recognition and similarity system 100 of FIG. 1. As shown at step 510, one or more text images are received from a collection of known text images. Accordingly, each of the one or more text images includes a corresponding font label or classifier that identifies the font in each of the one or more text images.

The one or more text images are synthesized, at step 512, to introduce slight variances that approximate variances that may exist in real-world text images. The slight variances may be introduced in any number or combination of ways, as described herein. In this regard, the slight variances are intended to mimic the variations that are likely to occur in real-world text images which, in turn, improve the accuracy of the CNN in the testing phase.

One or more training images are generated, at step 514, that include the slight variances, which are then cropped into training patches that are utilized as an input to the CNN. For example, the training images may be cropped into multiple square gray scale training patches. In some embodiments, the training patches are 105×105 square image patches.

Figure 6:
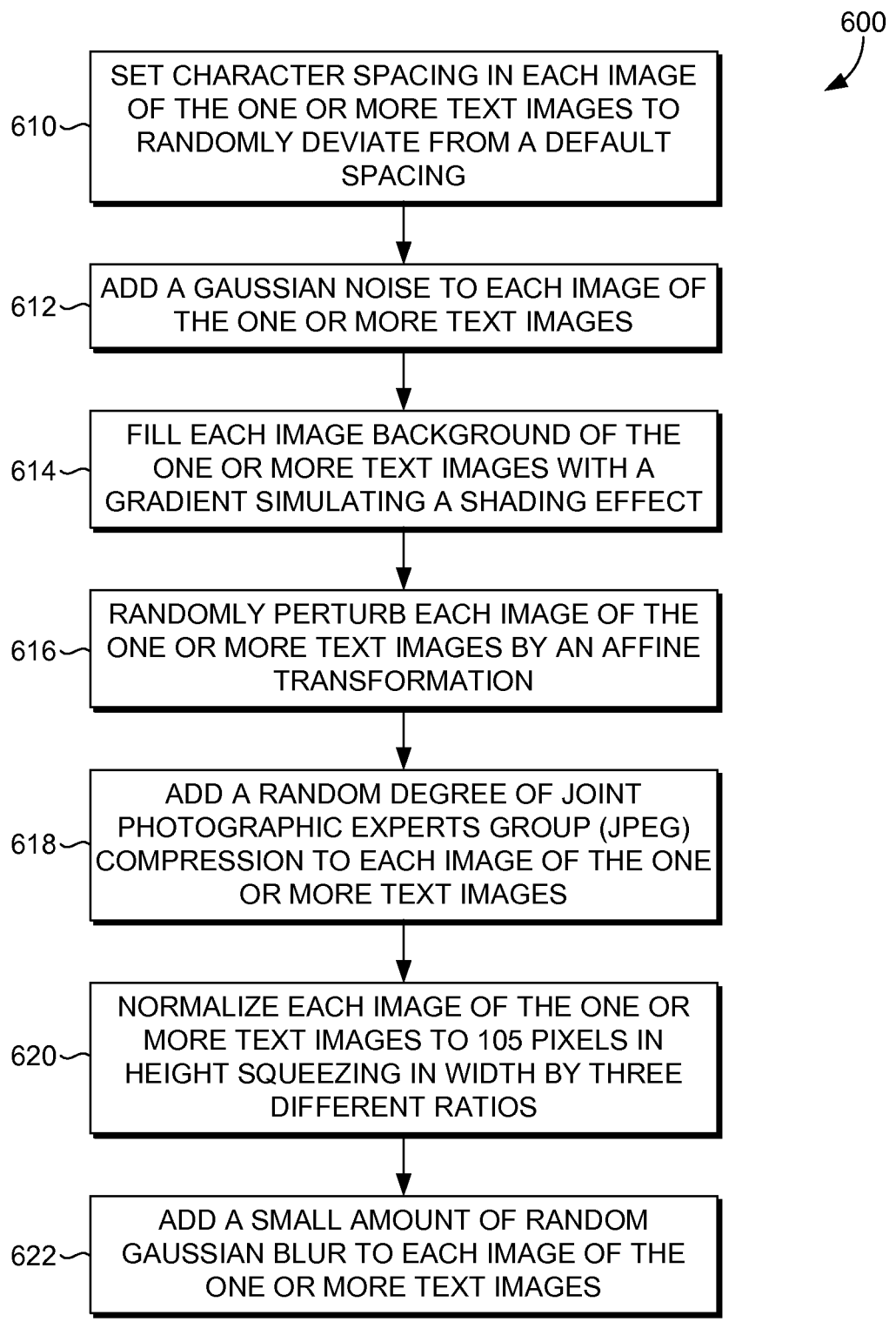
FIG. 6 is a flow diagram showing a method for synthesizing a training image in accordance with an embodiment of the present invention.

Referring now to FIG. 6, a flow diagram is provided that illustrates a method 600 for synthesizing a training image in accordance with an embodiment of the present invention. For instance, the method 600 may be employed utilizing the font recognition and similarity system 100 of FIG. 1. For clarity, each step illustrated in FIG. 6 may be employed individually or in any combination comprising any number of the steps by the font recognition and similarity system 100 of FIG. 1 during the synthesis process. As shown at step 610, the images may be synthesized by setting character spacing in each image to randomly deviate from a default spacing. A Gaussian noise may be added, at step 612, to each image. At step 614, the images may be synthesized by filling each image background of the one or more text images with a gradient to simulate a shading effect. Each image may be randomly perturbed, at step 616, by an affine transformation. At step 618, the images may be synthesized by adding a random degree of Joint Photographic Experts Group (JPEG) compression to each image of the one or more text images. Each image may be normalized to a fixed height and squeezed in width by a plurality of different aspect ratios, at step 620. The images may be synthesized, at step 622, by adding a small amount of random Gaussian blur to each image of the one or more text images.

Referring back to FIG. 5, at step 516, the CNN is trained with the training patches. In some embodiments, the CNN comprises five convolutional layers and three layers fully connected layers. The last fully connected layer may be fed into an N-way softmax function. N may be based on the number of fonts to model. In other words, if a collection of fonts being labeled comprises, for example, 2383 fonts, the last fully connected layer is fed into a 2383-way softmax function. A distribution of classified text images is produced, at step 518, over N classification labels. Continuing the example of a collection of 2383 fonts, a distribution of classified text images is produced over 2383 classification labels.

In some embodiments, normalization and max pooling layers are added to the CNN following the first two convolutional layers. Rectified linear unit (ReLU) non-linearity, an activation function, may be applied to an output of each convolutional and fully connected layer. As can be appreciated, any activation function may similarly be applied. In some embodiments, stochastic gradient descent is utilized for optimization. Stochastic gradient descent works well for large-scale problems, but other training algorithms may be utilized as well. The learning rate may be reduced by a factor after every epoch. In some embodiments, the learning rate is reduced by a factor of two after every epoch.

In some embodiments, the CNN is utilized to classify an unknown font image. The unknown font image may be normalized in height and squeezed in width in accordance with different aspect ratios. This results in a plurality of test patches corresponding to the different aspect ratios and views from the unknown font image. For each test patch, the CNN may output a softmax vector indicating the probabilities of each test patch belonging to a set of fonts. The plurality of softmax vectors may be averaged to obtain a final classification result for the unknown image.

Figure 7:
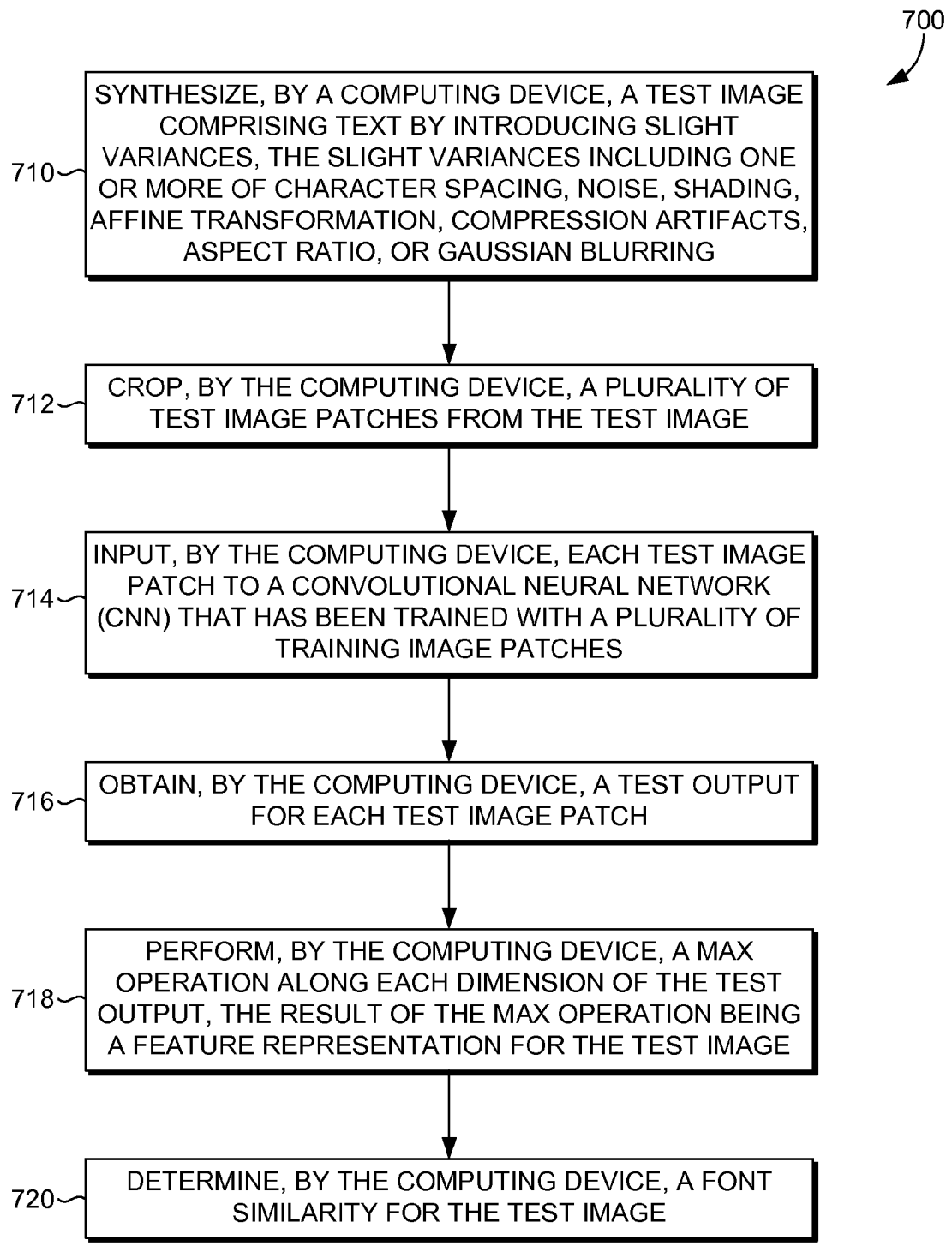
FIG. 7 is a flow diagram showing a method for determining font similarity in accordance with an embodiment of the present invention.

In FIG. 7, a flow diagram is provided that illustrates a method 700 for determining font similarity in accordance with an embodiment of the present invention. For instance, the method 700 may be employed utilizing the font recognition and similarity system 100 of FIG. 1. As shown at step 710, a test image comprising text is synthesized, by a computing device, to introduce slight variances. In some embodiments, the text comprises more than one sequence of text resulting in a plurality test images. In various embodiments, the slight variances include one or more of character spacing, noise, shading, affine transformation, compression artifacts, aspect ratio, or Gaussian blurring.

At step 712, a plurality of test image patches are cropped, by the computing device, from the test image. Each test image patch is input, by the computing device, to a convolutional neural network (CNN), at step 714, that has been trained with a plurality of training image patches. A test output is obtained by the computing device, at step 716, from the second to last fully connected layer for each test image patch.

For example, for the i-th font, a single test image $I_i$ is synthesized utilizing any synthesis process described herein. Image patches may then be cropped from the test image and fed into the CNN. In some embodiments, n 105×105 pixel image patches are cropped from the test image. The second to last fully connected layer output for each image patch may then be obtained. In some embodiments, the output is denoted as $f_7$, which is a 4096-dimensional vector.

A max operation is performed by the computing device, at step 718, along each dimension of the test output. The result of the max operation is a feature representation for the test image. For example, a max operation is performed along each dimension of $f_7$ across each of the image patches. The feature representation for test image $I_i$ can be defined as $F_i=\max\{f_7^j\}$. As mentioned above, $f_7^j$ is the second to last fully connected layer output for the j-th image patch. As a result, $F_i$ is also a 4096-dimensional vector.

To define the font similarity between font i and font j, an image $I_j$ for font j may be synthesized, as described herein, utilizing the same text that was used for training image $I_i$. The feature representation $F_j$ may then be extracted from $I_j$. The font similarity between i and j may be defined, in one embodiment, as $s(i,j)=F_i^T F_j$. In another embodiment, a radial basis function (RBF) kernel, $s(i,j)=\exp(-\|F_i-F_j\|_2^2/\sigma^2)$ may be utilized to define font similarity. Accordingly, a font similarity is determined by the computing device, at step 720, for the test image.

In some embodiments, similar fonts are suggested based on the feature representation of the test image. In some embodiments, feature representations of known fonts are compared to the feature representation of the test image to classify an unknown font of the test image. For example, the feature representation of the test image may be compared, by any method described herein or other various methods (e.g., utilizing a font similarity matrix), to the feature representation extracted from other fonts in a collection of fonts. In some embodiments, a font similarity graph is built for a collection of fonts based on the font similarity.

Figure 8:
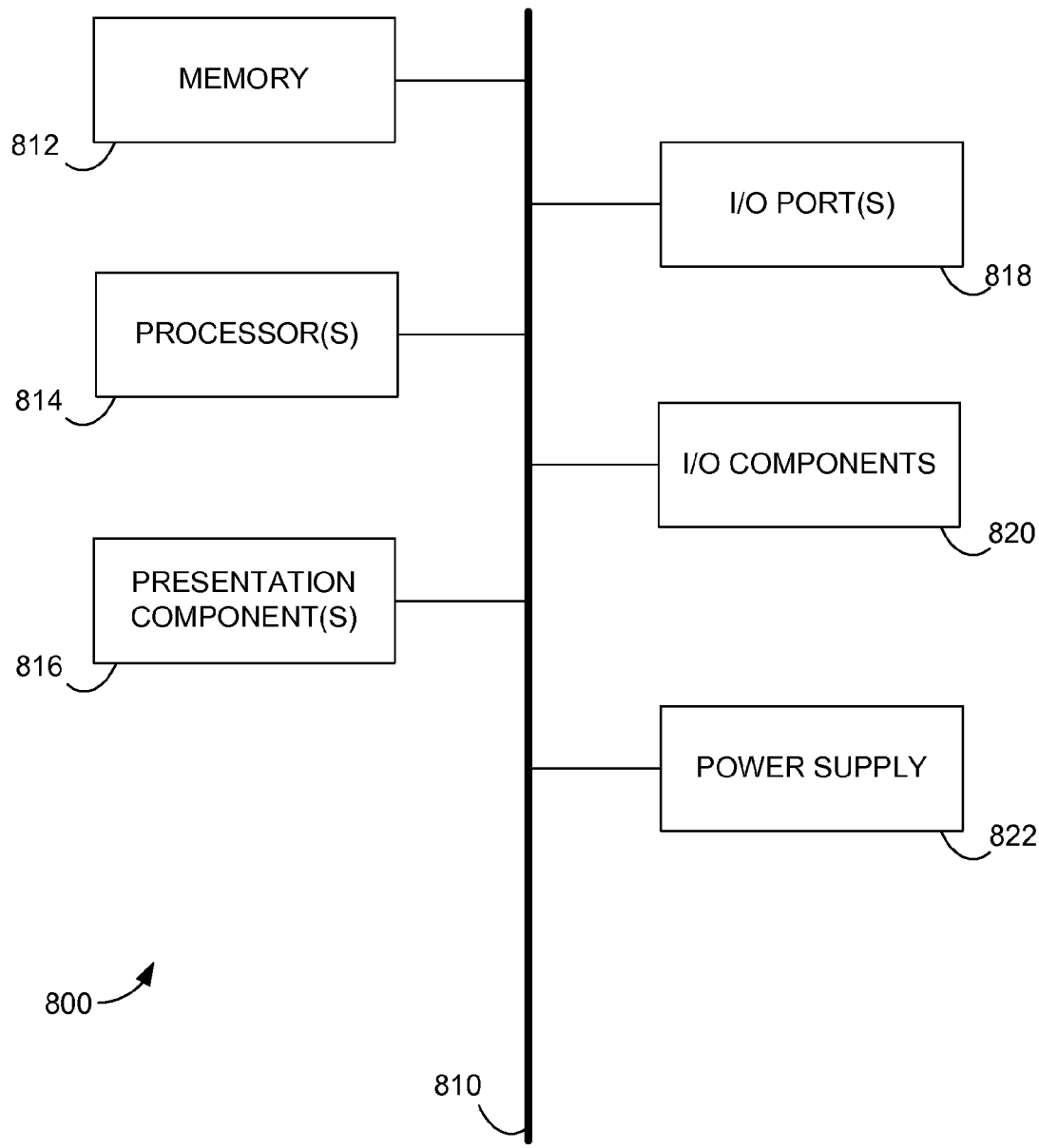
FIG. 8 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output (I/O) ports 818, input/output components 1520, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as, stereoscopic camera systems, infrared camera systems, RGB camera systems, and combinations of these for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

As can be understood, embodiments of the present invention provide for an objective approach for determining the visual similarity between fonts. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium comprising computer-useable instructions that, when used by one or more computing devices, cause the one or more computing devices to perform operations comprising:
   receiving one or more text images, each of the one or more text images including a corresponding font label;
   synthesizing the one or more text images to introduce variances in the one or more text images;
   generating one or more training images that include the variances;
   cropping the one or more training images into training patches that are utilized as an input to a convolutional neural network (CNN);
   training the CNN with the training patches, the CNN comprising a plurality of convolutional layers and a plurality of fully connected layers; and
   producing a distribution of classified text images.

2. The non-transitory computer storage medium of claim 1, wherein synthesizing the one or more text images includes setting character spacing in each text image of the one or more text images to randomly deviate from a default spacing.

3. The non-transitory computer storage medium of claim 1, wherein synthesizing the one or more text images includes adding Gaussian noise to each text image of the one or more text images.

4. The non-transitory computer storage medium of claim 1, wherein each of the one or more text images includes an image background and synthesizing the one or more text images includes filling each of the image backgrounds of the one or more text images with a gradient simulating a shading effect.

5. The non-transitory computer storage medium of claim 1, wherein synthesizing the one or more text images includes randomly perturbing each text image of the one or more text images by an affine transformation.

6. The non-transitory computer storage medium of claim 1, wherein synthesizing the one or more text images includes adding a random degree of Joint Photographic Experts Group (JPEG) compression to each text image of the one or more text images.

7. The non-transitory computer storage medium of claim 1, wherein synthesizing the one or more text images includes normalizing each text image of the one or more text images to a fixed height and squeezing in width by a plurality of different aspect ratios.

8. The non-transitory computer storage medium of claim 1, wherein synthesizing the one or more text images includes adding random Gaussian blur to each text image of the one or more text images.

9. The non-transitory computer storage medium of claim 1, wherein each of the one or more training images are cropped into a plurality of square gray scale training patches.

10. The non-transitory computer storage medium of claim 1, the operations further comprising adding a normalization layer and a max pooling layer to the CNN, wherein the normalization and max pooling layers following a first convolutional layer of the plurality of convolutional layers.

11. The non-transitory computer storage medium of claim 1, the operations further comprising applying a rectified linear unit (ReLU) non-linearity to an output of each of the plurality of convolutional layers and each of the plurality of fully connected layers.

12. The non-transitory computer storage medium of claim 1, wherein training the CNN comprises a plurality of epochs and at least one of:
utilizing stochastic gradient descent for optimization; or
reducing a learning rate after each epoch of the plurality of epochs.

13. The non-transitory computer storage medium of claim 1, the operations further comprising utilizing the CNN to classify an unknown font image.

14. The non-transitory computer storage medium of claim 13, the operations further comprising:
normalizing the unknown font image;
squeezing the unknown font image in width based on a plurality of different aspect ratios, resulting in a plurality of test patches corresponding to the plurality of different aspect ratios and views from the unknown font image;
wherein for each test patch of the plurality of test patches, the CNN outputs a plurality of softmax vectors indicating one or more probabilities of each test patch belonging to a set of fonts; and
averaging the plurality of softmax vectors to obtain a final classification result for the unknown font image.

15. A computer-implemented method comprising:
synthesizing, by a computing device, a test image comprising text by introducing variances, the variances including one or more of character spacing, noise, shading, affine transformation, compression artifacts, aspect ratio, or Gaussian blurring;
cropping, by the computing device, a plurality of test image patches from the test image;
inputting, by the computing device, each test image patch of the plurality of test image patches to a convolutional neural network (CNN) that has been trained with a plurality of training image patches;
obtaining, by the computing device, a test output for each test image patch of the plurality of test image patches, wherein the test output includes one or more dimensions;
performing, by the computing device, a max operation along each of the one or more dimensions of the test output, a result of the max operation being a feature representation for the test image; and
determining, by the computing device, a font similarity for the test image.

16. The method of claim 15, wherein the text comprises a plurality of sequences of text resulting in a plurality of test images that includes the test image.

17. The method of claim 15, further comprising suggesting one or more fonts based on the feature representation for the test image.

18. The method of claim 15, further comprising building a font similarity graph for a collection of fonts based on the font similarity for the test image.

19. The method of claim 15, further comprising comparing feature representations for known fonts to the feature representation for the test image to classify an unknown font of the test image.

20. A computerized system comprising:
one or more processors; and
one or more computer storage media storing computer-useable instructions that, when used by the one or more processors, cause the one or more processors to:
synthesize one or more text images comprising a font to introduce variances based on variances that exist in real-world text images;
generate one or more training images that include the variances in the one or more text images;
crop the one or more training images into one or more training patches that are utilized as an input to a convolutional neural network (CNN);
train the CNN with the one or more training patches, the CNN comprising a plurality of convolutional layers and a plurality of fully connected layers;
produce a distribution of classified text images;
utilize the CNN to extract a feature representation from each of the one or more text images;
utilize the CNN to extract a feature representation from a test image comprising an unknown font; and
determine a font similarity between the unknown font of the test image and one or more fonts that comprise one or more of the classified text images.

* * * * *